3,809,662
EMULSION POLYMERIZATION OF DIOLEFINS AND VINYL COMPOUNDS IN THE PRESENCE OF ALGINATE METAL SALTS TO PRODUCE HIGH POLYMER CONCENTRATION, LOW VISCOSITY LATEXES

Yoshihiko Araki, Naotake Sato, and Mikio Takahashi, Yokohama, Japan, assignors to Nippon Oil Company Limited, Tokyo, Japan
No Drawing. Filed Dec. 28, 1971, Ser. No. 213,167
Claims priority, application Japan, Dec. 29, 1970, 46/121,055
Int. Cl. C08f 1/13, 1/66, 45/18
U.S. Cl. 260—17.4 BB            6 Claims

ABSTRACT OF THE DISCLOSURE

A process is disclosed for the production of synthetic rubber latexes by polymerizing aliphatic conjugated diolefins or mixtures of these diolefins and vinyl compounds in an emulsion polymerization system. A latex of high polymer concentration and low viscosity is made available by the process wherein the polymerization of monomers is conducted particularly in the presence of two typical additives, one of which is a water-soluble metal salt and the other is a water-soluble alginate. Importantly, the metal salt is added first and thereafter the alginate is added to the system to secure a high quality latex.

---

This invention relates to the production of synthetic rubber latexes, more particularly to a process for producing latexes of the type having relatively high polymer concentration and relatively low viscosity.

Synthetic rubber latexes of high solid content find wide application for example in the manufacture of foam rubber, paints, adhesives and binders and in the surface finishing of paper and fabrics. Advantageously, such highly concentrated latexes can be transported with ease and with a minimum of cost. To suit these applications, the latex should be also desirably low in its viscosity. It is well recognized that the solid content of latex can be increased at a relatively low viscosity by increasing the particle size of polymer and improving its particle distribution pattern.

Heretofore, two typical methods have been proposed for obtaining synthetic rubber latexes of high concentration and low viscosity by increasing the particle size of the polymer. According to one such method, a latex of low polymer concentration and relatively small particle size is subjected to concentration to a desired level after or during cohesion of dispersed polymer particles by suitable physical or chemical treatment. This conventional method has the various difficulties that it is apt to entail production of large quantities of coagulated materials which are economically objectionable; expensive and non-reclaimable additives are required which would adversely affect purity of the latex; and costly additional equipments are needed.

The other known method produces a latex having a high polymer concentration by polymerizing highly concentrated monomers, viz with the ratio of monomer to water held greater than unity, in the presence of a small amount of emulsifiers. While this method does not require any special costly equipment or large quantities of additives, it is reported to be not entirely acceptable in view of the fact that the polymer particles are held within the border-line between stable and unstable so as to effect coalescence of the dispersed particles, which would necessarily deteriorate the reproducibility of uniform quality polymer.

Whereas, it is the primary object of this invention to provide an improved process for producing synthetic rubber latexes of high polymer concentration and low viscosity, without involving the above-noted difficulties of the conventional processes.

This and other more specific objects and features of the invention will appear clear from the detail description which follows with reference to certain preferred embodiments of the invention and from the appended claims.

Briefly stated, the desired latexes according to the invention can be obtained by polymerizing aliphatic conjugated diolefins or a mixture of these diolefins and vinyl compounds in an emulsion polymerization system which contains a soap of fatty acids, rosin soap or a mixture thereof as an emulsifier, in the presence of water-soluble alginate and a water-soluble salt of one or more metals selected from the group consisting of calcium, zinc, strontium, cadmium and barium, where the water-soluble metal salt or salts should be first admixed with the emulsifier and thereafter with the water-soluble alginate for addition to the polymerization system. This specific sequence of adding the various materials has now been found critically important to ensure good reproducibility of high concentration, low viscosity latexes according to the invention.

More specifically, in the polymerization of aliphatic conjugated diolefins or a mixture of these diolefins and vinyl compounds in the presence of a fatty acid soap, rosin soap or a mixture thereof, the process according to the invention comprises adding a water-soluble metal salt in an amount of $1 \times 10^{-5}$ to $1 \times 10^{-3}$ moles as metal ions per 100 parts by weight of monomer, followed by the addition of 0.00001–0.1 part by weight of water-soluble alginate per 100 parts by weight of monomer, and allowing the polymerizaiton reaction to take place at temperatures ranging between 30° and 80° C.

Advantageously, the synthetic rubber latex made available by the process of the invention contains at least 1% or more of polymer having a particle size of greater than 0.8 micron.

The term water-soluble alginate as used herein includes sodium alginate, ammonium alginate and magnesium alginate. Importantly, for good results, these water-soluble alginates should be used in an amount of 0.00001–0.1 part by weight, preferably 0.0001–0.001 part by weight per 100 parts by weight of monomer, viz. aliphatic conjugated diolefins or mixtures of these and vinyl compounds. Less amounts of the alginate will result in the failure of obtaining the desired quality latex product, while greater amounts will retard the rate of polymerization and entail the side-production of objectionable non-latex type solid polymers.

The term water-soluble metal salt is intended to collectively embrace calcium chloride, calcium bromide, calcium nitrate, calcium acetate, calcium formate, zinc chloride, zinc nitrate, strontium chloride, strontium bromide, strontium acetate, cadmium nitrate, cadmium formate, barium chloride, barium bromide and barium acetate. The effective amounts of these water-soluble metal salts are in the range of from $1 \times 10^{-5}$ to $1 \times 10^{-3}$ moles, preferably from $5 \times 10^{-5}$ to $5 \times 10^{-4}$ moles as metal ions ($Ba^{++}$, $Ca^{++}$ and $Zn^{++}$), per 100 parts by weight of the monomer. For example, anhydrous calcium chloride is used in an amount of 0.0011 to 0.11 preferably 0.006 to 0.055 part by weight per 100 parts by weight of the monomer. The amount of anhydrous barium acetate is effectively from 0.0025 to 0.255, preferably from 0.013 to 0.128 part by weight per 100 parts of the monomer. Less amounts of the metal salt than $1 \times 10^{-5}$ are not effective for the purposes of the invention, and any amounts in excess of $1 \times 10^{-3}$ will result in the formation of undesirably large quantities of coagulated materials and adversely affect the quality of product latex.

Two or more of these water-soluble metal salts may be combined, but importantly the total amount thereof should not depart from the specified range of from $1 \times 10^{-5}$ to $1 \times 10^{-3}$ moles.

A remarkable advantage of the present invention is found in the employment of the above two types of additives which contribute for only very small amounts to the production of a latex of high purity and high hydrocarbon content.

It will be understood that the type and quantity of each of the monomers, emulsifiers, modifiers and initiators may be chosen to suit the properties and end-use of a latex desired.

The monomer which may be employed in accordance with the invention includes aliphatic conjugated diolefins such as butadiene, isoprene or mixtures thereof and mixtures of aliphatic conjugated diolefins alone with or mixtures of these diolefins with one or more of vinyl compounds such as styrene, alpha-methylstyrene, divinylbenzene, acrylonitrile, acrylic acid, methacrylic acid and their esters such as n-butylacrylic acid ester.

The ratio of the monomers or mixtures thereof to water should be in the range of from 0.8 to 1.5, preferably from 1.0 to 1.25. Higher ratios tend to give a latex of high gel content, while lower ratios will produce less concentrated latex.

It has been found desirable to charge the monomers initially in whole to a reactor, but it is also possible to charge part of the monomers initially and add the remaining monomers later at a time point at which the polymerization has progressed to about 10% or less.

The emulsifier according to the invention includes alkali metal salts of higher fatty acids having from 8 to 20 carbon atoms per molecule such as sodium caprate, sodium laurate, potassium oleate; ammonium salts such as ammonium stearate; amine salts; alkali metal salt of rosin acid; and mixtures thereof. The rosin acid includes dehydrogenated rosin acid, hydrogenated rosin acid and disproportionated rosin acid. Effective amounts of these emulsifiers in the practice of the invention are as small as 1–2 parts per 100 parts monomer.

The modifier according to the invention includes mercaptans such as n-dodecylmercaptan and t-dodecylmercaptan, diisopropylxanthogen, sulfur and carbon tetrachloride.

The polymerization initiator suitable for the process of the invention includes persulfates such as potassium persulfate and ammonium persulfate.

The polymerization reaction temperature depends upon the rate of polymerization desired. It should be relatively low, preferably about 30°–50° C., during initial periods of polymerization and increased progressively and finally to about 60°–80° C.

Critically important in the practice of the invention is the order of adding the water-soluble metal salt and alginate to the polymerization system which initially contains the emulsifier; namely, the metal salt should be invariably first added, followed by the addition of the alginate. While the reason for this is not certain at the time of this application, water-soluble alginates are believably active in the polymerization system. The alginates may be added after the polymerization is initiated, preferably when the polymerization has progressed to a rate not exceeding 40%.

The process of the invention may be continuous or batchwise, whichever is more convenient.

The invention will be further described by way of the following examples which are given for purposes of illustration and not in the limiting sense.

All parts that appear in the comparative and inventive examples below are by weight unless otherwise noted.

COMPARATIVE EXAMPLES 1–2

100 parts butadiene, 53 parts water, 1 part sodium rosinate, 0.25 part n-dodecylmercaptan and 0.3 part potassium persulfate were charged into a glass-lined autoclave equipped with stirrer, and the polymerization was initiated at 44° C. The temperature was increased progressively in the manner disclosed by Whitby in "The Synthetic Rubber," p. 649. When the conversion of butadiene reached 60%, there was added a "booster" consisting of a modifier, initiator and emulsifier described by Smith et al. in "The Indian Rubber World," vol. 113, p. 814 (1946), which booster more specifically consists of 0.1 part n-dodecylmercaptan, 0.1 part potassium persulfate, 0.5 part potassium oleate and 4 parts water. The polymerization was thus continued at 66° C. for 68 hours. This experiment was conducted twice under similar conditions with the results given in Table 1.

TABLE 1

| Comparative Example | 1 | 2 |
|---|---|---|
| Reaction time (hrs.) | 68 | 68 |
| Total solid (percent) | 58.4 | 61.5 |
| Viscosity (cps.)* | 730 | 3,800 |
| Viscosity at 55% total solid content (cps.) | 240 | 650 |
| Coagulated material | Some | None |

*Determined by Brookfield Viscometer at 25° C. in accordance with ASTM D1417–61. Same applies to the comparative and inventive examples hereinafter given.

It is apparent from Table 1 above that the polymerization conditions employed in these comparative examples cannot produce a latex with good reproducibility of high polymer concentration and low viscosity.

COMPARATIVE EXAMPLES 3–5

The procedure of Comparative Example 1 was followed except that predetermined amounts of sodium alginate and potassium chloride were added upon initiation of the polymerization, with the results given in Table 2.

TABLE 2

| Comparative Example | 3 | 4 | 5 |
|---|---|---|---|
| Sodium alginate (parts) | | 0.0015 | 0.0025 |
| Potassium chloride (parts) | 0.1 | 0.1 | 0.2 |
| Reaction time (hrs.) | 60 | 68 | 65 |
| Total solid (percent) | | 59.7 | 56.5 |
| Viscosity (cps.) | | 1,100 | 380 |
| Viscosity at 55% total solid content (cps.) | | 310 | 180 |
| Coagulated material | (¹) | Some | (²) |

¹ All coagulated.  ² Greater part coagulated.

As apparent from the above results, large quantities of potassium chloride are required and considerable coagulated materials are inevitable.

COMPARATIVE EXAMPLES 6–7

The procedure of Comparative Example 1 was followed except that the polymerization was initiated in the presence of sodium alginate or zinc sulfate, with the results shown in Table 3.

TABLE 3

| Comparative Example | 6 | 7 |
|---|---|---|
| Sodium alginate (parts) | 0.001 | |
| ZnSO₄ (parts) | | 0.027 |
| Reaction time (hrs.) | 67 | 67 |
| Total solid (percent) | 59.8 | 58.5 |
| Viscosity (cps.) | 620 | 1,900 |
| Viscosity at 55% total solid contend (cps.) | 230 | 450 |
| Coagulated material | Some | Some |

This tabulated datum indicates that it is difficult to obtain a latex of desired quality when the polymerization is conducted in the sole presence of either sodium alginate or zinc sulfate.

INVENTIVE EXAMPLES 1–2

The procedure of Comparative Example 1 was followed except that sodium rosinate and zinc sulfate were admixed upon the initiation of the polymerization, followed by the addition of sodium alginate, with the results given in Table 4.

TABLE 4

| Inventive Example | 1 | 2 |
|---|---|---|
| Sodium alginate (parts) | 0.001 | 0.002 |
| ZnSO₄ (parts) | 0.027 | 0.027 |
| Reaction time (hrs.) | 72 | 72 |
| Total solid (percent) | 60.1 | 59.7 |
| Viscosity (cps.) | 120 | 110 |
| Viscosity at 55% total solid content (cps.) | 50 | 45 |
| Coagulated material | None | None |

This experimental datum shows that a latex of desirably high concentration and low viscosity can be obtained with excellent reproducibility in accordance with the invention.

INVENTIVE EXAMPLES 3–7

The procedure of Comparative Example 1 was followed except that predetermined amounts of emulsifiers and water-soluble metal salts shown in Table 5 below were admixed and charged to the polymerization system at the beginning of the reaction, followed by the addition of 0.0015 part ammonium alginate, with the results shown in Table 5.

TABLE 5

| | Inventive Example | | | | |
|---|---|---|---|---|---|
| | 3 | 4 | 5 | 6 | 7 |
| Type of water-soluble metal salts | CaCl₂ | CaCl₂ | SrCl₂·6H₂O | Cd(NO₃)₂ | BaCl₂ |
| Amount of water-soluble metal salts (parts) | 0.01 | 0.03 | 0.045 | 0.04 | 0.04 |
| Reaction time (hrs.) | 70 | 72 | 68 | 68 | 73 |
| Total solid (percent) | 59.3 | 59.2 | 59.5 | 58.2 | 58.8 |
| Viscosity (cps.) | 300 | 280 | 310 | 270 | 270 |
| Coagulated material | None | None | None | None | None |

INVENTIVE EXAMPLE 8

To a 20 liter, glass-lined autoclave equipped with stirrer were charged 1 part disproportionated sodium rosinate dissolved in 7 parts water, 0.03 part zinc sulfate dissolved in 1 part water, 0.25 part n-dodecylmercaptan, 0.3 potassium persulfate dissolved in 7 parts water, 0.001 part sodium alginate dissolved in 1 part water, 36 parts water, 25 parts styrene and 75 parts butadiene in that order. The polymerization was initiated at 46° C. and continued for 24 hours, when the temperature was increased to 52° C. The reaction was continued at this temperature for further 35 hours until the temperature was increased finally to 66° C. When conversion reached 45%, 0.25 part potassium oleate dissolved in 1 part water was added. With conversion up to 60%, a booster consisting of 0.1 n-dodecylmercaptan, 0.1 potassium persulfate, 0.5 potassium oleate and 4 parts water was added, followed by the addition of 0.75 part potassium rosinate. Thus, after a lapse of a total of 64 hours, there was obtained a latex having 58.8% solid content. The properties of the resulting latex are shown in Table 6 below.

TABLE 6

| | |
|---|---|
| Total solid (percent) | 58.8 |
| Viscosity (cps.) | 200 |
| Viscosity at 55% total solid content (cps.) | 80 |
| Surface tension (dyne/cm.) | 49 |
| pH | 9.8 |
| Mechanical stability (percent)[1] | 0 |
| Particle size distribution (percent):[2] | |
| 0.1 micron or less | 3 |
| 0.1 micron–0.2 micron | 30 |
| 0.2 micron–0.3 micron | 30 |
| 0.3 micron–0.4 micron | 8 |
| 0.4 micron–0.8 micron | 19 |
| 0.8 micron or above | 10 |

[1] Determined in accordance with the method suggested by Maron et al. in The Analytical Chemistry, vol. 25, section 7, p. 1087 (1953).
[2] Determined by the creaming method disclosed by Schmidt et al. in the Rubber Chemistry and Technology, vol. 34, p. 433 (1961).

The above test data indicate that a latex of low viscosity and having high concentration of large polymer particles can be produced by the process of the invention. It is also to be noted that the latex thus obtained contains a relatively low content of electrolytes and is highly stable in spite of small quantities of emulsifier present. It therefore finds suitable application for example in the formation of films and as starting latex for ABS resin.

What is claimed is:

1. In a process for producing a synthetic rubber latex by aqueous polymerization of an aliphatic conjugated diolefin or a mixture of said diolefin and a vinyl compound in the presence of an emulsifier which is a fatty acid soap, rosin soap or a mixture thereof, and wherein the ratio by weight of monomer to water is from 0.8 to 1.5, the improvement which comprises adding a water-soluble metal salt which is calcium chloride, calcium bromide, calcium nitrate, calcium acetate, calcium formate, zinc chloride, zinc nitrate, strontium bromide, strontium chloride, strontium acetate, cadmium nitrate, cadmium formate, barium chloride, barium bromide or barium acetate in an amount of $1 \times 10^{-5}$ to $1 \times 10^{-3}$ moles as metal ions per 100 parts by weight of monomer, followed by addition of 0.00001–0.1 part by weight of water-soluble alginate per 100 parts by weight of monomer and allowing the polymerization reaction to take place at temperatures ranging between 30° and 80° C.

2. The process as defined in claim 1 wherein said water-soluble alginate is selected from the group consisting of sodium alginate, ammonium alginate and magnesium alginate.

3. The process as defined in claim 1 which is carried out in the presence of a modifier selected from the group consisting of n-dodecylercaptan, t-dodecylmercaptan, diisopropylxanthogen, sulfur and carbon tetrachloride.

4. The process as defined in claim 1 which is carried out in the presence of a polymerization initiator selected from the group consisting of potassium persulfate and ammonium persulfate.

5. The process as defined in claim 1 wherein said emulsifier is selected from the group consisting of sodium caprate, sodium laurate, potassium oleate, ammonium salts, such as ammonium stearate, amine salts, alkali metal salt of rosin acid including dehydrogenated rosin acid, hydrogenated rosin acid and disproportionated rosin acid, and mixtures thereof.

6. The process according to claim 1 wherein the emulsifier is dissolved in water, followed by the water-soluble metal salt, the modifier, the initiator, the water-soluble alginate, the vinyl monomer and the conjugated diolefin and in the final product 10% has a partial size of at least 0.8 micron.

References Cited

UNITED STATES PATENTS

| 2,380,476 | 7/1945 | Stewart | 260—17.4 |
| 2,498,694 | 2/1950 | Mast | 260—17.4 |

FOREIGN PATENTS

| 233,907 | 12/1968 | U.S.S.R. | 260—17.4 |

WILLIAM H. SHORT, Primary Examiner

P. F. KULKOSKY, Assistant Examiner

U.S. Cl. X.R.

260—17.4 ST, 80 M